United States Patent
Zoeller et al.

(12)

(10) Patent No.: US 6,495,040 B1
(45) Date of Patent: *Dec. 17, 2002

(54) SEPTIC TANK FILTERING SYSTEM

(75) Inventors: Kenneth E. Zoeller, Louisville, KY (US); Matthew E. Byers, Lawrenceburg, KY (US); William V. West, Greenville, IN (US); Jason Fletcher, Louisville, KY (US)

(73) Assignee: Zoeller Co., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/992,945

(22) Filed: Nov. 6, 2001

Related U.S. Application Data (62) Division of application No. 09/639,545, filed on Aug. 16, 2000, now Pat. No. 6,331,247, which is a division of application No. 09/334,249, filed on Jun. 16, 1999, now Pat. No. 6,136,190.

(51) Int. Cl.[7] .............................................. B01D 21/00
(52) U.S. Cl. ....................... 210/299; 210/337; 210/342; 210/501; 210/532.2
(58) Field of Search ................................ 210/232, 256, 210/299, 311, 337, 338, 339, 342, 501, 532.2

(56) References Cited

U.S. PATENT DOCUMENTS

| 625,794 | A | * | 5/1899 | Newman | ..................... 210/342 |
| 1,207,776 | A | * | 12/1916 | McDonald | .................. 210/338 |

(List continued on next page.)

*Primary Examiner*—Christopher Upton
(74) *Attorney, Agent, or Firm*—Scott R. Cox (57) ABSTRACT

A filtering system for filtering effluent in a septic tank including an outer secondary filter secured within a pipe fitting, wherein the outer secondary filter includes a central opening passing therethrough; an inner primary filter, wherein the inner primary filter is slidingly engaged within the central opening in the outer secondary filter; and a filtering connection element, secured between the outer secondary filter and an inner surface of the pipe fitting, wherein the filtering connection element filters effluent passing upward through the filter pipe fitting and wherein upon removal of the inner primary filter, the outer secondary filter filters the effluent entering the pipe fitting before discharge. Either or both of the outer secondary filter or the inner primary filter may be formed with a biocide to retard the growth of biological material on their surfaces.

20 Claims, 11 Drawing Sheets

U.S. PATENT DOCUMENTS

| | | |
|---|---|---|
| 2,900,084 A | 9/1959 | Zabel |
| 3,069,252 A | 12/1962 | Josephis et al. |
| 3,288,674 A | 11/1966 | Yeager |
| 3,332,552 A | 7/1967 | Zabel |
| 3,347,386 A * | 10/1967 | Kraissl, Jr. .................. 210/342 |
| 3,348,689 A * | 10/1967 | Kraissl, Jr. .................. 210/342 |
| 3,443,366 A * | 5/1969 | Schwab ...................... 210/338 |
| 4,439,323 A | 3/1984 | Ball |
| 4,710,295 A | 12/1987 | Zabel |
| 5,192,037 A | 3/1993 | Moorefield |
| 5,207,896 A | 5/1993 | Graves |
| 5,264,120 A | 11/1993 | Graves |
| 5,306,425 A | 4/1994 | Graves |
| 5,332,160 A | 7/1994 | Ruskin |
| 5,382,357 A | 1/1995 | Nurse |
| 5,409,604 A | 4/1995 | Graves |
| 5,413,706 A | 5/1995 | Graves |
| 5,482,621 A | 1/1996 | Nurse |
| 5,492,635 A | 2/1996 | Ball |
| 5,569,387 A | 10/1996 | Browne et al. |
| 5,580,453 A | 12/1996 | Nurse, Jr. |
| 5,582,716 A | 12/1996 | Nurse, Jr. |
| 5,591,331 A | 1/1997 | Nurse, Jr. |
| 5,593,584 A | 1/1997 | Nurse, Jr. |
| 5,635,064 A | 6/1997 | Bovington |
| 5,683,577 A | 11/1997 | Nurse, Jr. |
| 5,690,824 A | 11/1997 | Stuth |
| 5,736,035 A | 4/1998 | Nurse, Jr. |
| 5,759,393 A | 6/1998 | Nurse, Jr. |
| 5,762,790 A * | 6/1998 | Zoeller .................... 210/532.2 |
| 5,762,793 A | 6/1998 | Nurse, Jr. |
| 5,779,896 A * | 7/1998 | Nurse, Jr. .................. 210/299 |
| 5,795,472 A | 8/1998 | Nurse, Jr. |
| 5,871,640 A * | 2/1999 | Gavin .................... 210/532.2 |
| 5,894,042 A | 4/1999 | Ferralli |

\* cited by examiner

SEPTIC TANK FILTERING SYSTEM

RELATED APPLICATIONS

This application is a divisional of application Ser. No. 09/639,545 filed Aug. 16, 2000, now U.S. Pat. No. 6,331,247, which is a divisional of application Ser. No. 09/334,249, filed Jun. 16, 1999, now U.S. Pat. No. 6,136,190.

BACKGROUND OF INVENTION

1. Field of Invention

This invention relates to devices used for the treatment of waste water. More specifically, this invention relates to a removable, two-part filtering system used for the filtering of liquid effluent contained in a septic tank.

2. Prior Art

Waste water discharged from commercial or residential property containing both liquid and solid wastes is typically collected in a waste water collector, such as a septic tank. In such septic tanks, the liquid and solids are generally distributed into three layers: an upper horizontal scum layer, a lower horizontal sludge layer, and a relatively clear, horizontal, liquid effluent layer between the two other layers. During operation of the septic tank systems, liquids from this horizontal, liquid effluent layer are intermittently discharged from the septic tank. During such discharge the solids contained within the septic tank are preferably retained in the septic tank to be decomposed during the normal operation of the system. As needed, the septic tanks may be cleaned to remove any settled solids.

During normal operations, some solids become mixed into the relatively clear horizontal, liquid effluent layer. Solids migrate into this layer associated with gas bubbles produced during metabolism of material contained in the lower sludge layer. In addition, large solids with specific gravities similar to that of the liquid effluent layer may also be discharged. These solids may be discharged with the effluent, if not filtered out of the effluent. Excess solids discharged with the effluent may gradually degrade the effectiveness of the entire septic system.

To reduce the likelihood of discharge of solids from the septic system, a number of different filtering devices for liquid effluent have been developed. For example, cylindrical mesh screen filtering systems which surround a gravity flow outlet system and discharge pump are disclosed in U.S. Pat. Nos. 5,207,896 and 4,439,323.

Other filtering devices, which may be placed within a septic system, which use a filtering system different from a mesh screen are disclosed, for example, in U.S. Pat. Nos. 5,683,577, 5,482,621 and 5,382,357. These patents disclose filtration of effluent using a specific flow pattern for the effluent through an open bottom of the filter element, out the sides of the filter element into an annular space adjacent to the filter element, and finally to the discharge opening of the device for discharging the filtered effluent from the septic system. See also U.S. Pat. No. 5,690,824.

Other systems for filtering solids from the effluent of a septic system utilizing a stacked disk dam system as the filtering system are disclosed in U.S. Pat. Nos. 5,593,584, 5,582,716, 5,207,896, 4,710,295, 3,332,552 and 2,900,084. See also U.S. Pat. Nos. 5,413,706, 5,409,604, 5,306,425, 5,264,120 and 5,207,896 which disclose both a mesh screen and a disk dam system to filter the effluent.

U.S. Pat. No. 5,795,472 discloses a multistage filter device which includes removable side walls which have a filtering capacity. U.S. Pat. Nos. 5,759,393 and 5,591,331 disclose a filtering system comprising a plurality of vertically extending removable side walls, each of which contains a filtering screen for filtering the effluent. In addition, U.S. Pat. No. 5,736,035 discloses an outlet filter including a two-piece filter element.

A filter system containing a removable filter with diagonal slits for filtering effluent in a septic system is disclosed in U.S. Pat. No. 5,569,387.

In addition to systems which utilize a single filter element within a filter system, multiple filter element systems for filtering effluent in a septic system are disclosed in U.S. Pat. Nos. 5,762,793, 5,635,064, 5,580,453 and 5,492,635. Each of these patents describes a specific flow pattern for the effluent entering the filter system and exiting through a discharge opening in the housing of the filter system.

Because of limitations on the flow of the effluent through these prior art systems, problems often arise from clogging of the filters which necessitates frequent cleaning of the systems. Some of the screen filter systems can even collapse during normal use, also necessitating cleaning and/or replacement. It has been generally recognized that filter systems clog for several reasons. The system may clog from entrainment of solid particles in the effluent stream. Alternatively, the openings in the filter system may be clogged from the growth of a biological film on its surface. Elimination of the biological film significantly enhances the life expectancy of the filter system. The incorporation of a biocide into a plastic piping to kill or limit the growth of bacteria and other microorganisms present in a water irrigation system was disclosed in U.S. Pat. No. 5,332,160. See U.S. Pat. No. 5,192,037 for the use of copper sulfate for a similar system. See also U.S. Pat. No. 3,288,674 for the use of 10,10' oxydiphenoxarsine as a bactericide for use in plastics and U.S. Pat. No. 3,069,252 for the use of this material to control growth.

Other problems may arise when the filters of these filter systems are removed from the septic tank for cleaning. When the filtering capability of these systems is removed, these systems fail to provide any backup mechanism to filter effluent being discharged during the cleaning process. This may result in an undesired discharge of solids through the discharge opening into the lateral system.

Thus, a need exists for a more efficient filtration system for filtering solids from the effluent of a septic system, especially during cleaning of the filter for the system, which overcomes the problems present in the prior systems.

Accordingly, it is an object of this invention to disclose a filter system for filtering the effluent present in a waste water system.

It is a further object of this invention to disclose a filtering system for filtering effluent from a waste water system which filtering system contains a significant amount of filtering surface, thus reducing the likelihood of clogging of the filters during normal operation.

It is a further object of this invention to disclose a filtering system containing primary and secondary filter elements which are easy to clean and replace.

It is a still further object of this invention to disclose a filtering system utilizing a primary and secondary filters, one secured within the other filter, such that the effluent passing through these filters is filtered continually, even when one of the filters has been removed for cleaning.

It is a further object of this invention to disclose a filtering system which permits a significant volume of liquid effluent to be filtered by the filtering system with a reduced likelihood of clogging of the filtering system.

It is a still further object of the invention to disclose a treatment for the filtering system that reduces the growth of a biological film on the filtering system during normal operations.

It is a further object of the invention to disclose a primary and secondary filtering system treated with a chemical biocide which reduces the growth of a biological film on the filtering system.

These and other objects and features of the present invention will become apparent to those skilled in the art from a consideration of the following detailed description, drawings and claims. The description, along with the accompanying drawings, provides a selected example of construction of the device to illustrate the invention.

SUMMARY OF INVENTION

In accordance with the present invention there is provided a removable filtering system for filtering liquid effluent contained in a waste water system, which includes a tubular, outer secondary filter, which is secured within an effluent discharge pipe fitting, wherein the outer secondary filter includes a central opening passing vertically therethrough; an inner primary filter, which is slidingly engaged within the central opening in the outer secondary filter; and a filtering connection element, secured to the outer secondary filter against an inner surface of the discharge pipe fitting, wherein the filtering connection element filters effluent passing upward through the discharge pipe fitting and wherein upon removal of the inner primary filter from the discharge pipe, the outer secondary filter continues to filter effluent passing through the discharge pipe fitting. Thus, even when the inner primary filter has been removed from the system for cleaning and/or replacement, effluent cannot be discharged out of the septic tank without first being filtered by the outer secondary filter.

In an alternative embodiment, the filtering connection element is an integral element of a specialized outlet pipe fitting.

In a further alternative embodiment, a second removable, filtering system can be secured to the first filtering system to provide additional filtration for effluent present in the septic tank. In this embodiment, a second effluent discharge pipe fitting is secured to the first effluent discharge pipe fitting and the second effluent discharge pipe fitting has contained therein a second outer secondary filter, a second inner primary filter and a second filtering connection element.

In a further alternative embodiment, one or more of the filters contains a biocide which retards the growth of a biological film on these filters.

BRIEF DESCRIPTION OF THE DRAWINGS

This invention will now be described with reference to the accompanying drawings in which.

DETAILED DESCRIPTION OF THE PREFERRED EMBODIMENT

Figure 1:
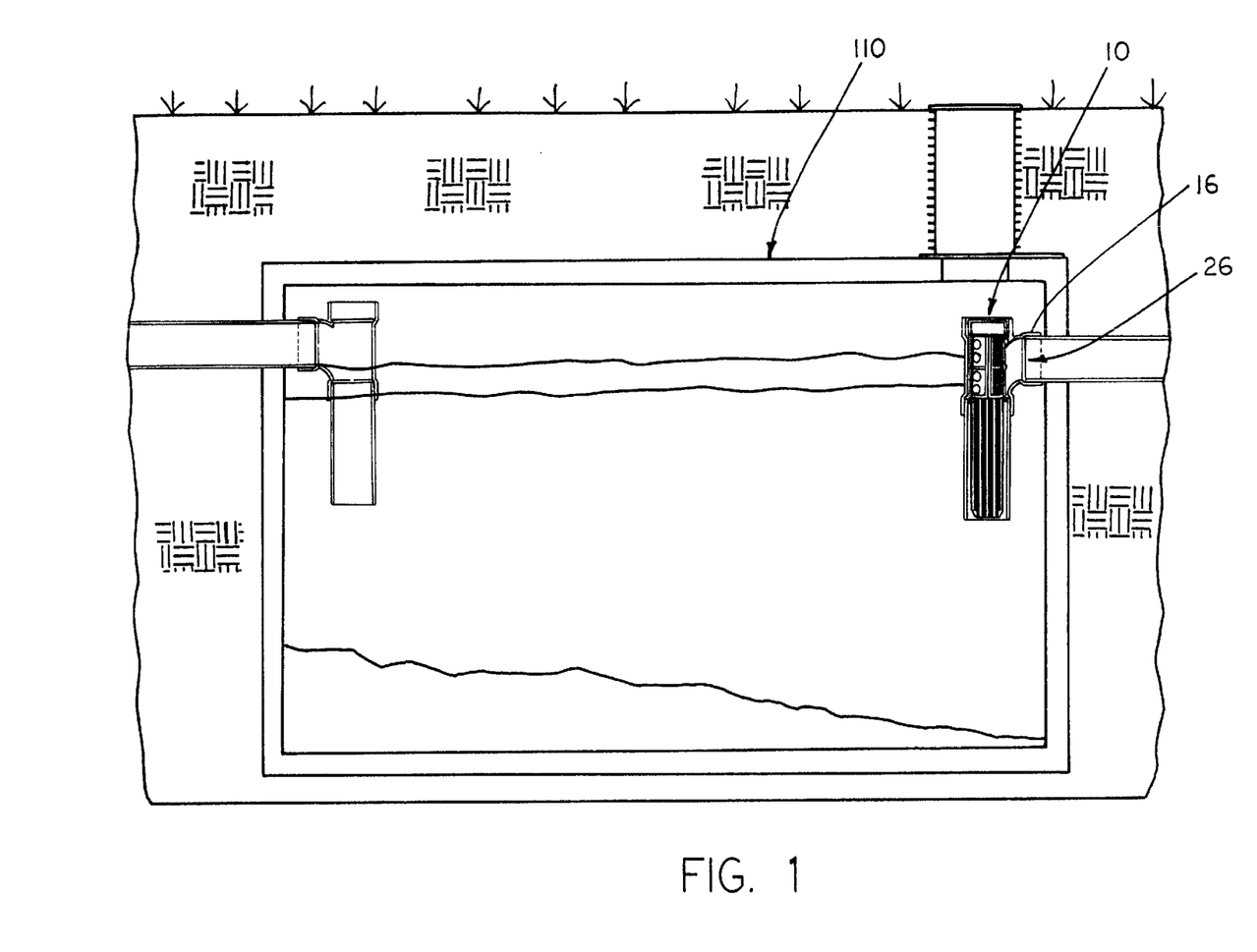
FIG. 1 is a sectional view of one embodiment of the removable septic tank filtering system located within a conventional septic tank.
Figure 2:
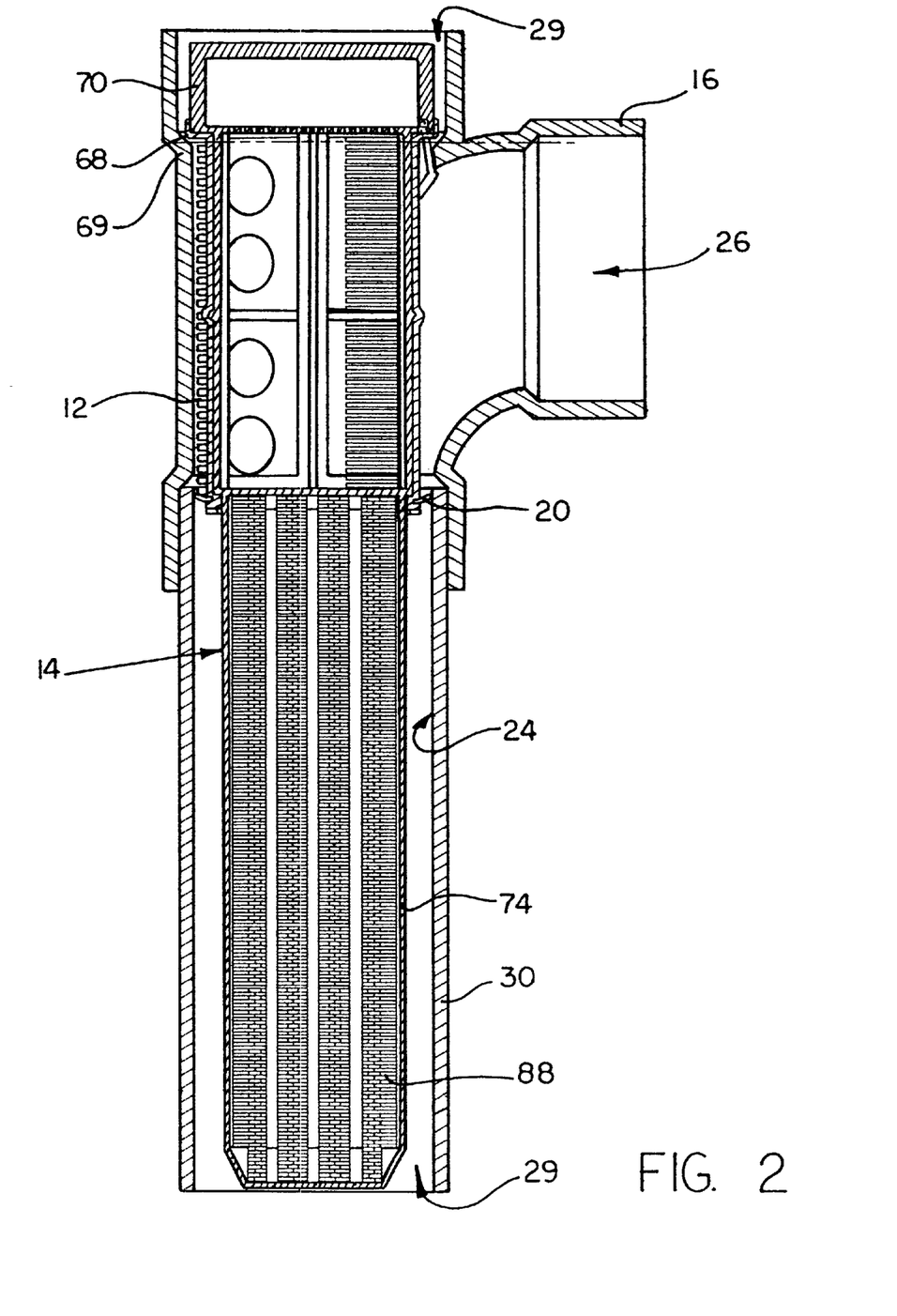
FIG. 2 is a cutaway side view of the removable septic tank filtering system taken along the line 2—2 in FIG. 2*b*.
Figure 3:
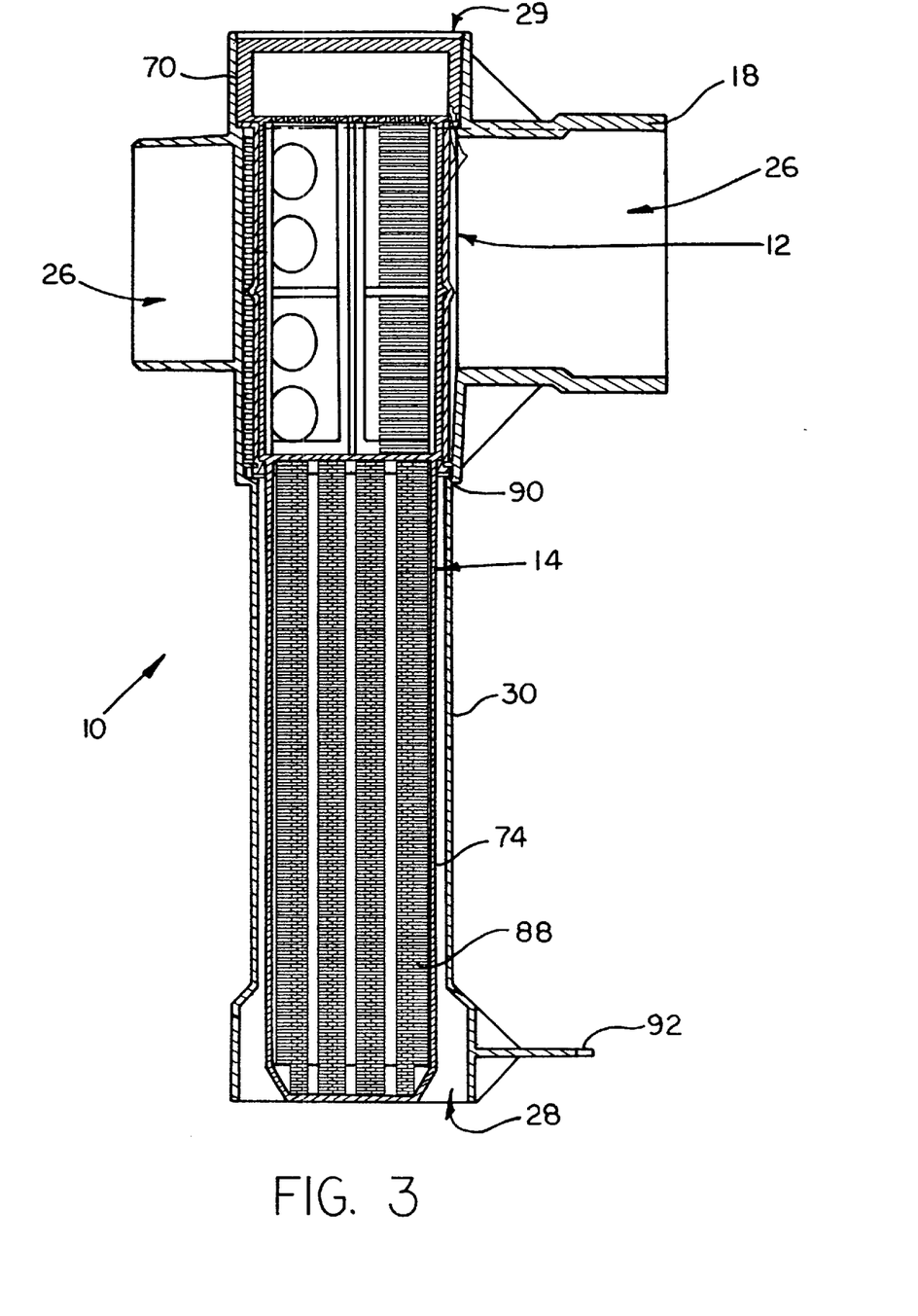
FIG. 3 is an alternative embodiment of the removable septic tank filtering system contained within a specialized discharge pipe fitting taken along the line 3—3 in FIG. 3*b*.
Figure 3A:
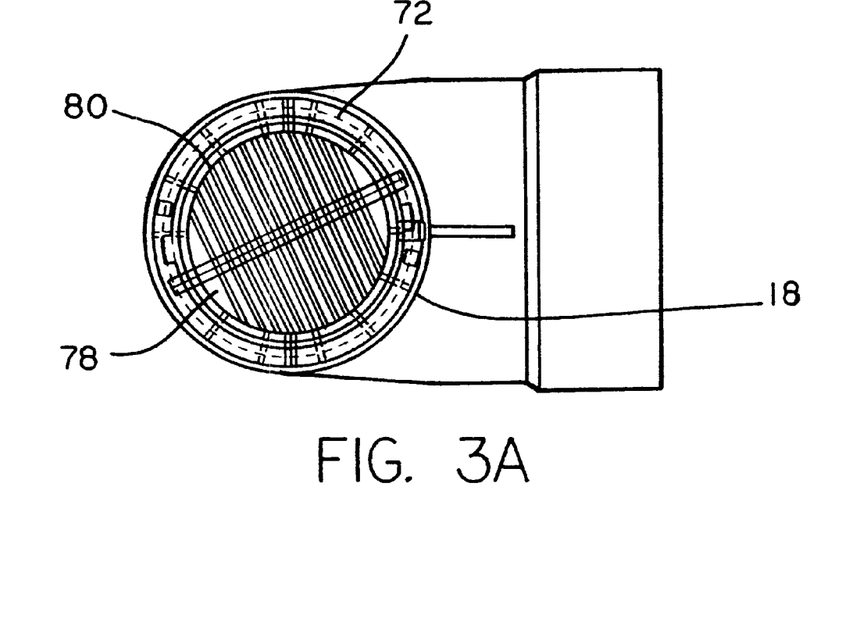
FIG. 3*a* is a top end view of the alternative filtering system of FIG. 3.
Figure 3B:
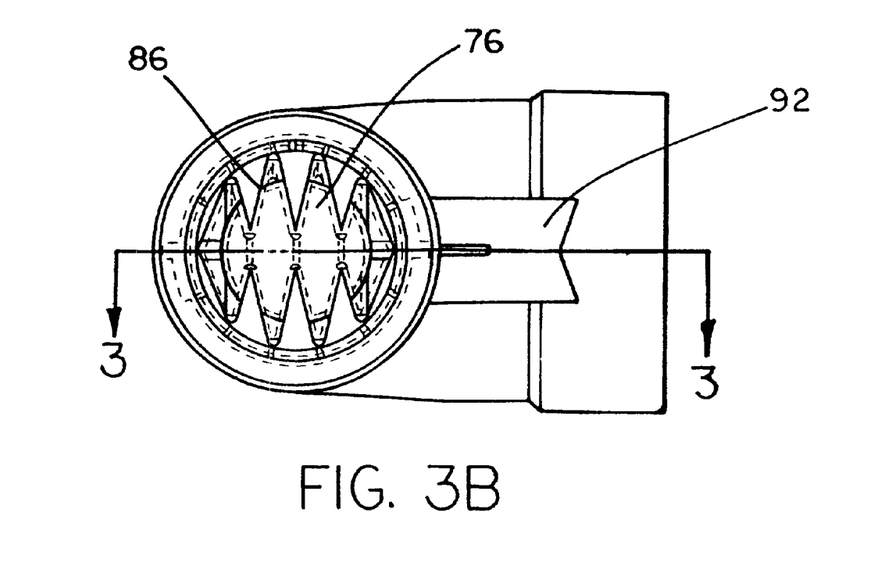
FIG. 3*b* is a bottom end view of the alternative filtering system of FIG. 3.
Figure 4:
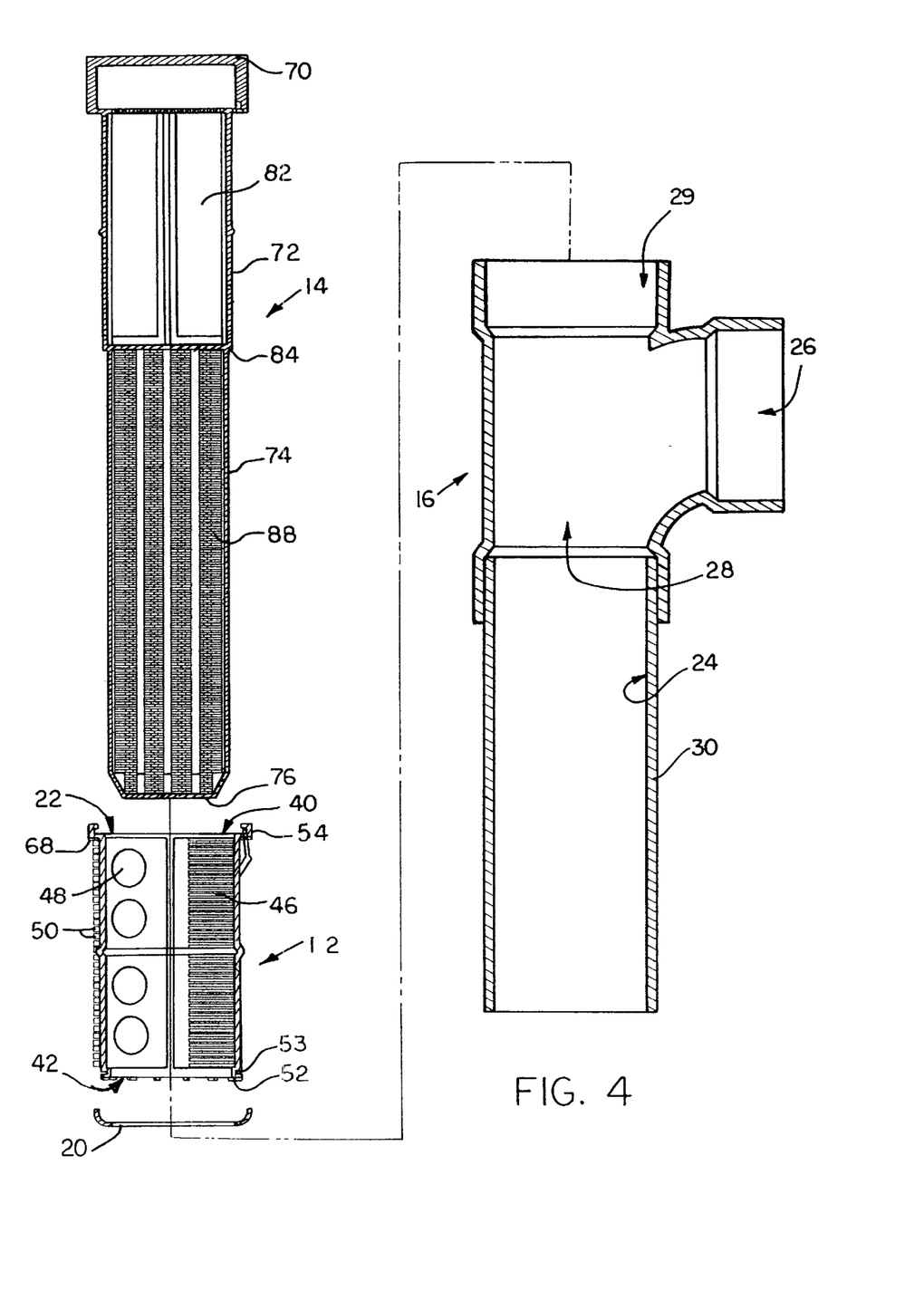
FIG. 4 is an exploded view of the removable septic tank filtering system of FIG. 2.
Figure 5:
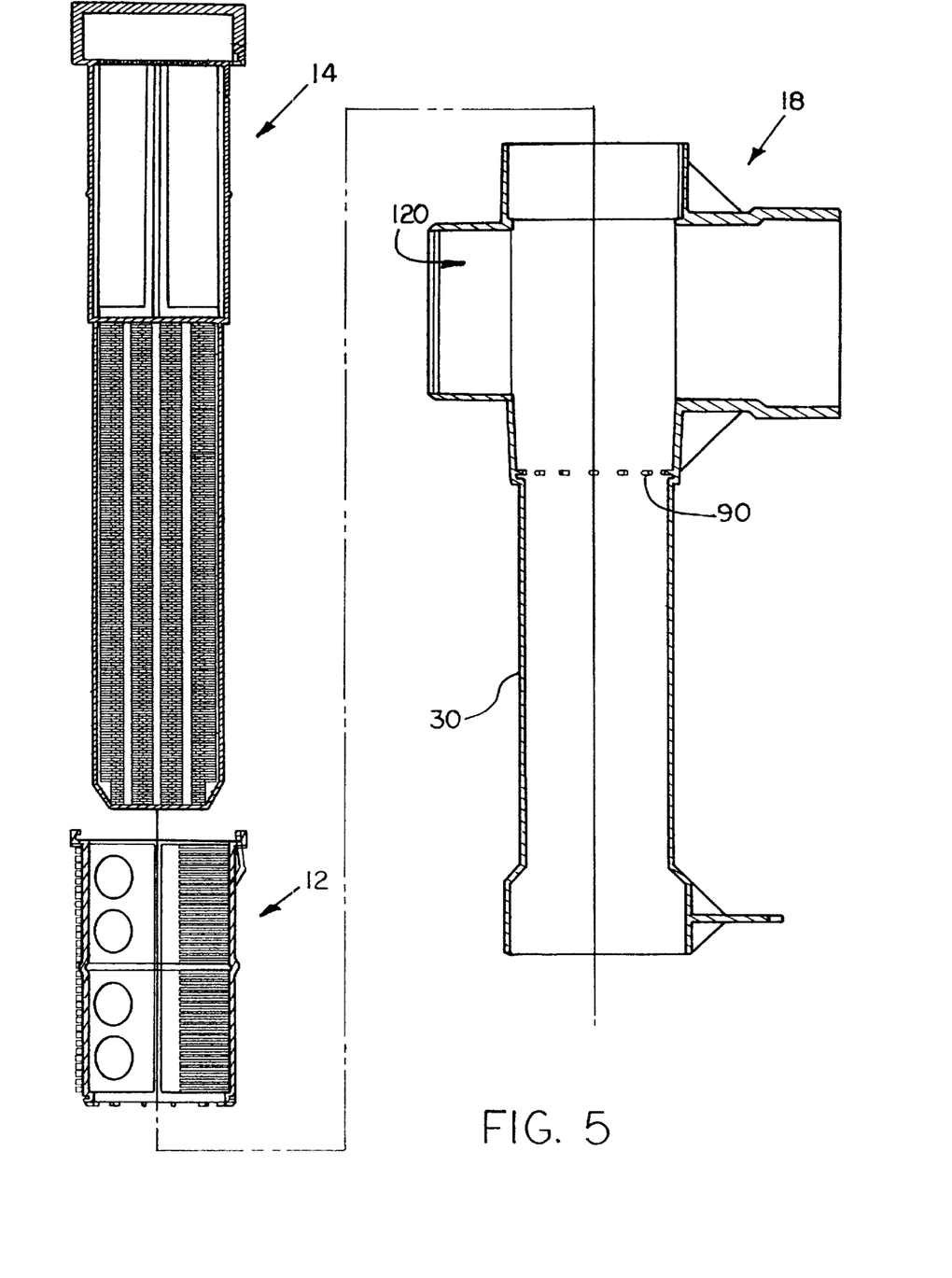
FIG. 5 is an exploded view of the alternative embodiment of the septic tank filtering system of FIG. 3.

Although the invention is adaptable to a wide variety of uses, it is shown in the drawings for purpose of illustration as embodied in FIGS. 1, 2 and 4 as a removable filtering system (10) for filtering liquid effluent present in a waste water system, preferably a septic tank (110), secured within an outlet pipe fitting (16), preferably a specialized outlet pipe fitting (18) as shown in FIGS. 3 and 5. This filtering system (10) is comprised of an outer secondary filter (12) secured within the outlet pipe fitting (16), an inner primary filter (14), slidingly engaged within a central opening (22) in the outer secondary filter (12), and a filtering connection element (20), secured to the outer secondary filter (12) between the outer secondary filter (12) and an inner surface (24) of the outlet pipe fitting (16).

The filtering system (10) is utilized within a waste water collection container, preferably a septic tank (110) as shown in FIG. 1. The septic tank (110) typically receives raw sewage and waste water from a residence or commercial facility. During normal operation, solids are distributed into a lower sludge layer or an upper horizontal scum layer. Contained between these two layers is the generally liquid, effluent layer. The filtering system (10) is designed to filter the liquid, effluent layer to remove solids from that effluent layer so that filtered effluent may be discharged from the septic tank through the discharge opening (26) for normal dispersion thereafter in the lateral system.

The outlet pipe fitting (16) is a closed system except for an open bottom (28) and top (29), as shown in FIGS. 2 and 4. In order to meet code requirements, an expansion piece (30) is frequently secured to the outlet pipe fitting (16), which piece (30) is designed to extend a designated depth into the liquid, effluent layer contained in the septic tank (110). The length of this extension piece (30) is dependent upon local septic system regulations.

Figures 6, 6A, 7, 8:
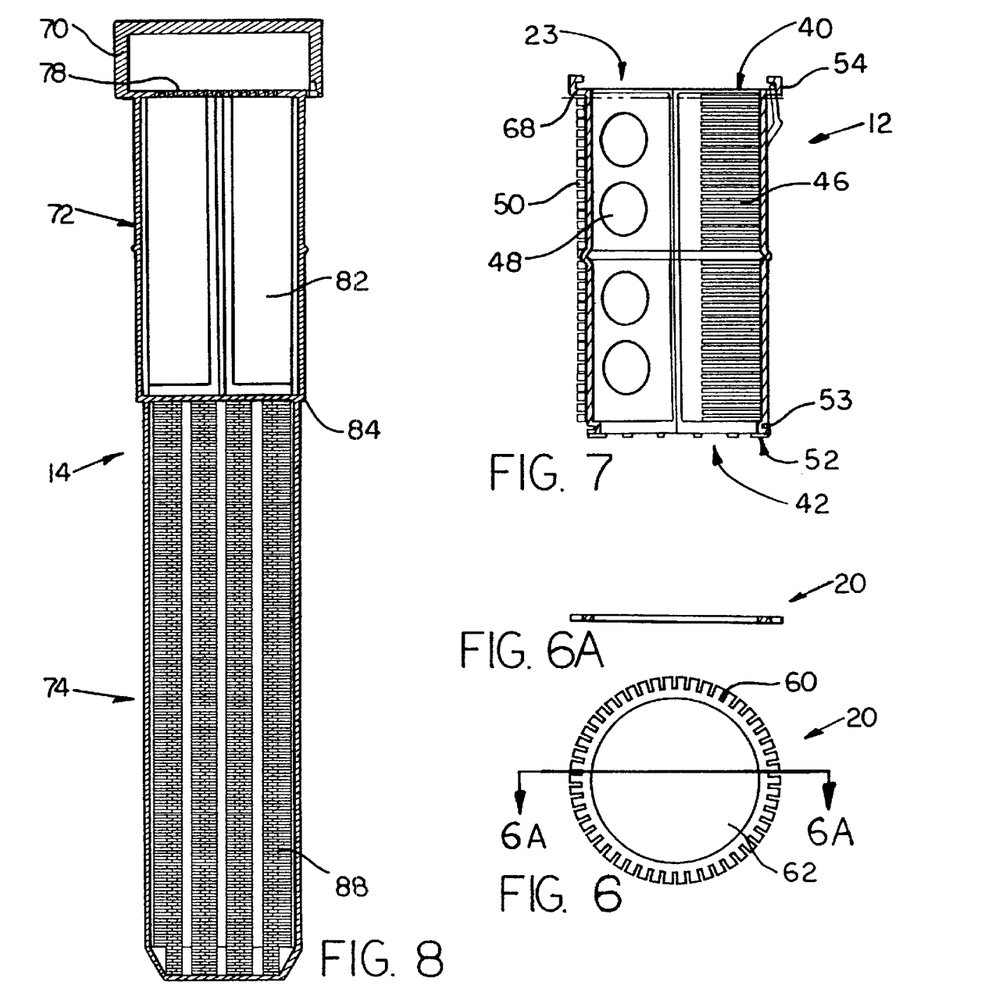
FIG. 6 is a top end view of the filtering connection element.
FIG. 6*a* is a side view of the filtering connection element.
FIG. 7 is a side view of the outer secondary filter.
FIG. 8 is a side view of the inner primary filter taken along the line 8—8 in FIG. 8*b*.
Figure 7A:
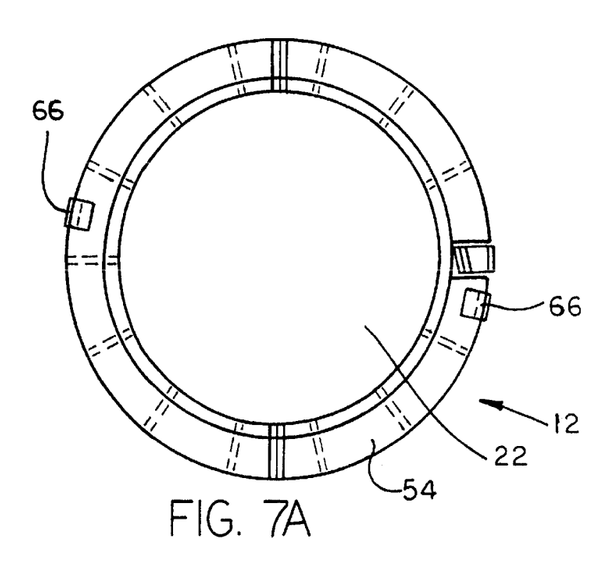
FIG. 7*a* is a top end view of the outer secondary filter.

As shown in FIG. 2, the outer secondary filter (12) is first secured within the outlet pipe fitting (16). The outer secondary filter (12) is generally formed in a tubular shape with an open top (40) and an open bottom (42), as shown in FIGS. 4, 7 and 7a. These openings (40, 42) extend through the outer secondary filter (12) to form the central opening (22) and have a diameter approximately equal to the outer diameter of the inner primary filter (14). Thus, the inner primary filter (14) can be slid through the central opening (22) within the outer secondary filter (12). The diameter of the outer secondary filter (12) is approximately the same as the inner diameter of the outlet pipe fitting (16) so that the outer secondary filter (12) can be placed within the outlet pipe fitting (16) with close tolerances. The height of the outer secondary filter (12) must be sufficient to cover completely the discharge opening (26) in the outlet pipe fitting (16). Thus, as shown in FIG. 2, the outer secondary filter (12) when secured in place in the outlet pipe fitting (16) extends from above the discharge opening (26) to a position below the bottom of the discharge opening (26).

Preferably, the outer secondary filter (12) has one or more columns of filtering slots (46) passing through the surface of the side (44) of the outer secondary filter (12) as shown in FIGS. 4 and 7. These filtering slots (46) are conventional in size, generally no more than about 1/16 of an inch in height and about 1/2 inch to about 2 inches in width. The primary purpose of these filtering slots (46) is to filter any effluent which passes through the outer secondary filter (12) before it is discharged out the discharge opening (26).

As shown on FIGS. 4 and 7, in addition to the columns of filtering slots (46) which are present in the side (44) of the outer secondary filter (12), preferably one or more columns of larger openings (48) are also provided. These larger openings (48) are designed to allow the effluent to pass through these openings (48) to reach that portion of the outside of the side (44) of the outer secondary filter (12) which is not in immediate communication with the discharge opening (26) in the outlet pipe fitting (16). Also by this structure, any effluent located outside of the side (44) of the outer secondary filter (12) can also pass through these openings (48) into the opening (22) within the outer secondary filter (12) for discharge through the filtering slots (46) and out the discharge opening (26) in the outlet pipe fitting (16). The size of these openings (48) is not particularly critical.

Secured to the outside surface of the side (44) of the upper secondary filter (12) away from the filtering slots (46) are a plurality of filtering projections (50), preferably formed in a vertical row extending the height of the outer secondary filter (12), as shown. in FIGS. 4, 5, 7 and 7b. Each individual filtering projection (50) is generally about 1/16 of an inch apart from each other filtering projection (50), extending from the bottom to the top of the outer secondary filter (12). Two or more of these vertical rows of filtering projections (50) are preferably provided, preferably three such rows, each of which are located approximately 90 degrees apart from each other row of filtering projections (50) on the side (44) of the outer secondary filter (12). These rows of projections (50) are preferably located on the outer secondary filter (12) at a location which is between the openings (48) in the side (44) of the outer secondary filter and the discharge opening (26) in the outlet pipe fitting (16). Thus, effluent which passes from the inside of the secondary filter (12) through the openings (48) in the outer secondary filter (12) must then pass through at least one row of these filtering projections (50) to be filtered before that filtered effluent can enter the discharge opening (26) in the outlet pipe fitting (16). These filtering projections (50) also filter any effluent which flows upward through the filtering connection element (20) between the outlet pipe fitting (18) and the inner primary filter (14) to the outside of the outer secondary filter (12), before it can enter the discharge opening (26).

Figure 2A:
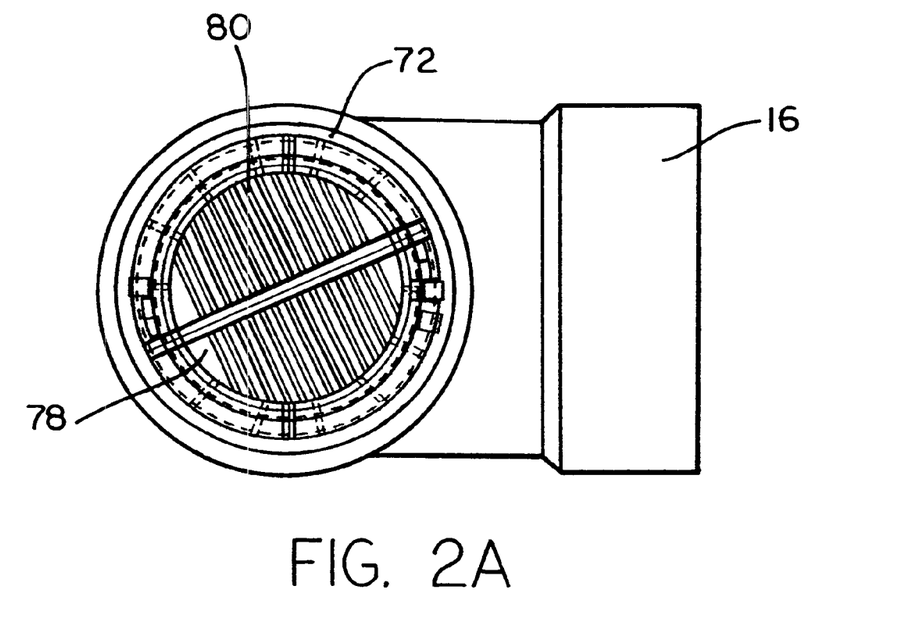
FIG. 2*a* is a top end view of the filtering system of FIG. 2.
Figure 2B:
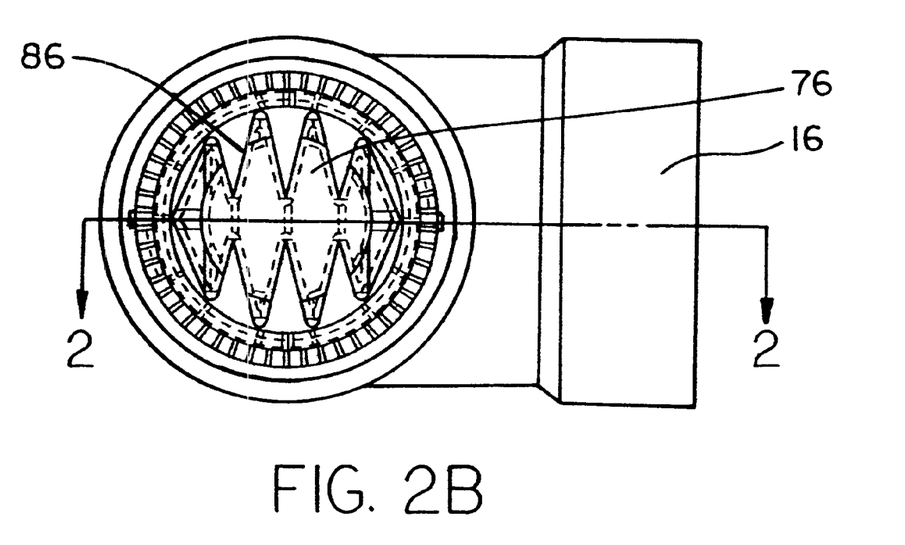
FIG. 2*b* is a bottom end view of the filtering system of FIG. 2.
Figure 2C:
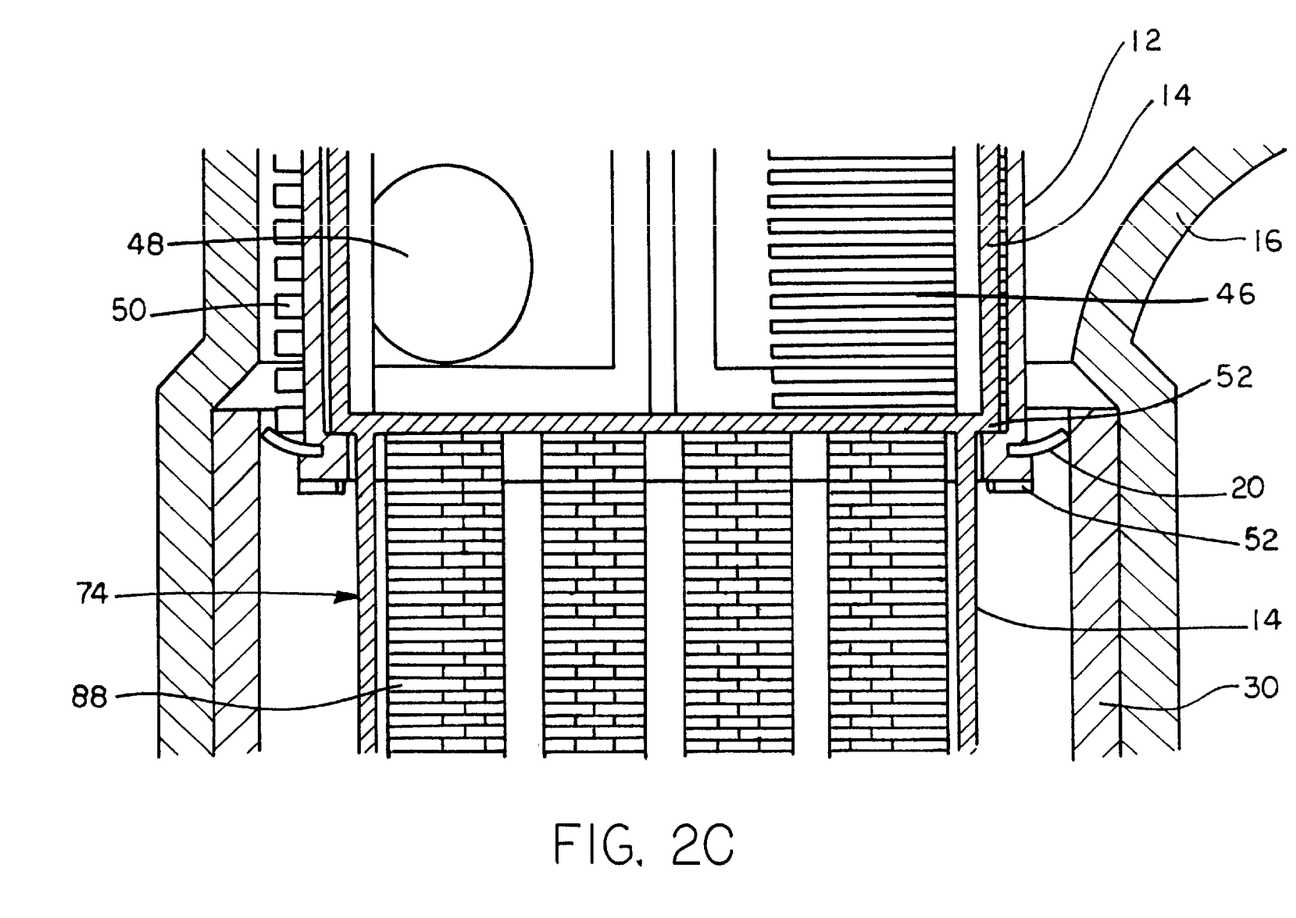
FIG. 2*c* is an enlarged cut away side view of a portion of the removable septic tank system as shown in FIG. 2 showing a portion of the outer secondary filter with attached filtering connection element and inner primary filter located within the outlet pipe fitting.

Because of variances in the diameter of the outer secondary filter (12), in a preferred embodiment the filtering connection element (20) is secured within the outlet pipe fitting (16) near or at the bottom edge (52) of the outer secondary filter (12), as shown in FIG. 2c.

The filtering connection element (20), as shown in FIGS. 2c, 6 and 6a, is a generally round, disk-shaped element with an open interior, which contains a plurality of filtering slots (60) cut into its outside edge. This filtering connection element (20) has a large circular interior opening (62), which is placed within a groove (53) cut into the bottom edge (52) of the outer secondary filter (12) as shown in FIGS. 2(c), 4 and 7.

The filtering slots (60) in the outside edge of the filter connection element (20) are formed with a size and shape that are sufficient to filter adequately any effluent which passes through them. Thus, preferably, these filtering slots (60) are approximately 1/16 of an inch or less in width. This filtering connection element (20) can be made of any conventional material which can function as a positioning element, such as neoprene or butyl rubber. In use, the filter connection element (20) is stretched and placed within the groove (53) located at the bottom edge (52) of the outer secondary filter (12). The outer secondary filter (12) is then placed within the outlet pipe fitting (16) as shown in FIG. 2a. The primary function of the filtering slots (60) in the filtering connection element (20) is to filter effluent, which passes up within the extension piece (30) connected to the outlet pipe fitting outside of the outer secondary filter (12).

Secured within the outer secondary filter (12) is the inner primary filter (14) as shown in FIGS. 2, 4 and 8. The inner primary filter (14) is generally an extended tubular element containing a plurality of filtering surfaces along most of its length for filtering effluent passing through the filter system (10).

The inner primary filter (14) as shown in FIGS. 4 and 8 is generally comprised of a top handle element (70), an open top section (72), a lower filtering section (74) and a closed bottom (76).

The top handle element (70) is secured to the top section (72) of the inner primary filter (14) by conventional securing methods or is molded as an integral component of the filter (14). This top handle element (70) is used to rotate the inner primary filter (14) in place and to remove the inner primary filter (14) from the filtering system (10).

Figure 8A:
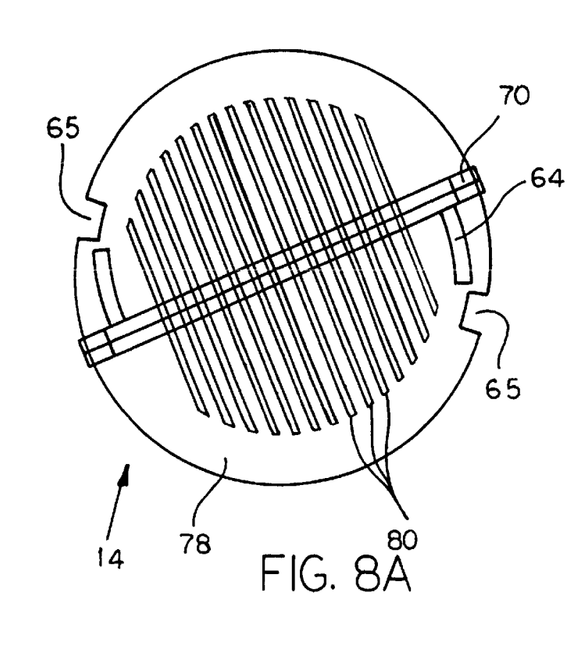
FIG. 8*a* is a top end view of the inner primary filter.

At the top of the top section (72) of the inner primary filter (14), but beneath the top handle element (70), is a top disc lid (78) as shown in FIG. 8a, which covers the top section (72) of the inner primary filter (14). This disc lid (78) is secured to the top section (72) conventionally or preferably is molded as an integral component. It contains a series of filtering openings (80), as shown in FIG. 8a. These filtering openings (80) are similar in size to the filtering slots (46) present in the wall (44) of the outer secondary filter (14). These filter openings (80) filter any effluent which overflows the top of the outlet pipe fitting (16) and the inner primary filter (14), thus preventing unfiltered effluent from being discharged out of the discharge opening (26).

The top section (72) of the inner primary filter (14) generally aligns with the outer secondary filter (12) as shown by a comparison of FIGS. 3, 7 and 8. This top section (72) can be formed in any shape which cooperates with the outer secondary filter (12) to permit the outer secondary filter (12) to filter the effluent and discharge the filtered effluent through the discharge opening (26). Because the outer secondary filter (12) contains filtering slots (46), it is not necessary that this top section (72) of the inner primary filter (14) also contain a filtering system for the effluent. Thus, in a preferred embodiment, this top section (72) of the inner primary filter (14) contains a plurality of extended, vertical openings (82), preferably two or more, which extend generally the entire height of this top section (72) of the inner primary filter (14) as shown in FIGS. 4 and 8 which align with the filtering slots (46) and the openings (48) contained in the outer secondary filter (12). In a preferred embodiment, the bottom edge (84) of this top portion (72) of the inner primary filter (14) rests against the bottom edge (52) of the outer secondary filter (12) within the outlet pipe fitting (16), as shown in FIGS. 2c and 3.

Figure 8B:
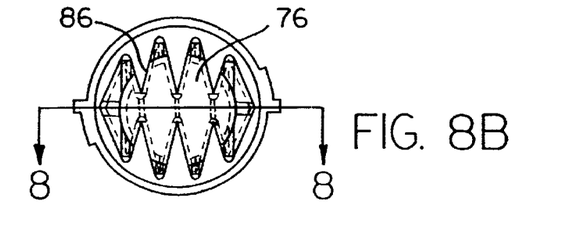
FIG. 8*b* is a bottom end view of the inner primary filter.

The primary filtering of the effluent by the inner primary filter (14) is performed by the lower filtering section (74), which is shown in FIGS. 2, 4 and 8. This lower filtering section (74) can be formed in any shape and form which provides for efficient filtering of effluent contained within the septic tank (110). In one preferred embodiment, this lower filtering section (74) is formed in a series of V-shaped sections (86) joined together as shown in FIGS. 2b and 8b. Each side of these V-shaped sections (86) contains a series of filtering openings (88), which are generally formed in the shape of the other filtering openings disclosed in this invention, such as the filtering slots (46) formed in the side of the outer secondary filter (12) and the filtering openings (80) formed in the top disc lid (78) of the inner primary filter (14).

The bottom (76) of the inner primary filter (14) is closed so that effluent does not enter the V-shaped sections (86) except through the side of those sections (86).

In a preferred embodiment, a biocidal compound is dispersed or molded throughout the inner primary filter (14) or the outer secondary filter (12) or both. This biocidal compound retards or prevents the growth of biological compounds on the surfaces of these filters (12, 14). By preventing the growth of biological compounds, the filter slots in the system (10) are more likely to remain open, thus reducing the likelihood of clogging of these slots. Acceptable biocidal compounds include antibacterial compounds such as 10,10' oxydiphenoxarsine and trichlorophenoxyphenal. While some have speculated that the growth of a biological film actually enhances the filtering process by reducing the size of the filtering openings and removing nutrients from the effluent present in the septic tank (110), it has been discovered that retarding the growth of biological material on the surface of these filtering structures actually reduces the need for frequent cleaning of the filtering structures. In addition, instead of waiting for slots to fill with a biofilm mass which then may enhance filtration, it is now possible to reduce the size of the filtering opening, without being concerned about biofilm growth.

Figure 7B:
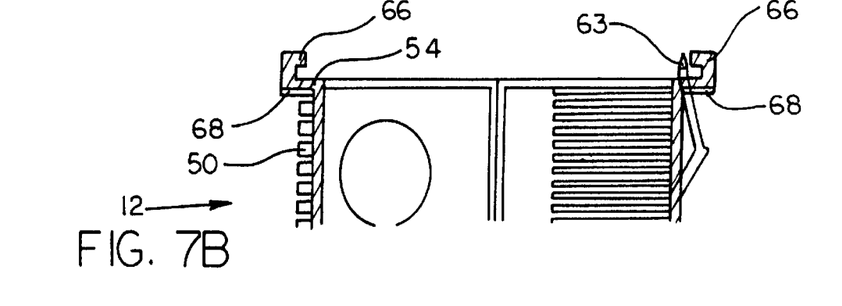
FIG. 7*b* is an enlarged, cutaway side view of a top portion of the outer secondary filter of FIG. 7.

The outer secondary filter (12) and the inner primary filter (14) preferably also contain a system which permits them to be secured together when in place in the outlet pipe fitting (16). This system is especially useful when both filter systems (12, 14) are removed at the same time for cleaning. In one preferred embodiment as shown in FIGS. 7a, 7b and 8a, the top edge (54) of the outer secondary filter (12) and the top disc lid (78) of the inner primary filter (14) can be secured together using a notch and slot arrangement. When the inner primary filter (14) is inserted through the outer secondary filter (12), the release latch (63) passes through slot (64) and notch (65) passes over coupling clips (66).

By rotating the handle (70) clockwise the release latch (63) is moved into the center of slot (64). The notch (65) is also passed under the coupling clips (66) at the same time so that the inner primary filter (14) and secondary outer filter (12) are locked together as one unit. The release latch (63) and the coupling clips (66) are engaged at the same time, allowing the outer secondary filter (12) and inner primary filter (14) to be removed for cleaning. In this preferred embodiment, the inner primary filter (14) and the outer secondary filter (12) form a single unit. When the top handle element (70) is then pulled upward, both the inner primary filter (14) and the outer secondary filter (12) are removed together from the outlet pipe fitting (16) for cleaning and inspection.

Preferably there is secured to the bottom of the coupling clips (66) a plurality of filtering projections (68), preferably four or more located around the bottom surface of the coupling clips (66). These filtering projections (68) rest against a lip (69) of the pipe fitting (16), as shown in FIG. 2. The filtering projections are preferably about $\frac{1}{16}$" in height and about $\frac{1}{16}$" to $\frac{1}{2}$" in width. Because the filtering projections (68) create an open gap between the lip (69) of the pipe fitting (16) and the bottom of the coupling clips (66), effluent can still pass through this gap even when the outer secondary filter (12) is secured in place in the pipe fitting (16). These filtering projections (68) prevent a seal from being formed in the pipe (16) between the outer secondary filter (12) and the pipe fitting (16); making removal of the outer secondary filter (12) easier for cleaning and replacement. However, because this gap is quite small (about $\frac{1}{16}$"), effluent passing therethrough is still filtered before discharge out the discharge opening (26) even when the outer secondary filter (12) is firmly in place within the pipe fitting (16).

As an alternative to the conventional outlet pipe fitting (16) which is shown in FIGS. 2 and 4, the specialized outlet pipe fitting (18), as shown in FIGS. 3 and 5, can be utilized. This specialized outlet pipe fitting (18) is specifically designed to be used with the outer secondary filter (12) and the inner primary filter (14) and eliminates the necessity for the separate filtering connection element (20). The specialized outlet pipe fitting (18) contains a series of filtering projections (90) located on the inside of the outlet pipe fitting which form an integral element of the specialized outlet pipe fitting (18). Thus, when the outer secondary filter (12) is placed within this specialized outlet pipe fitting (18), these projections (90) align with the bottom edge (54) of the outer secondary filter (12) to filter effluent passing upward in the space around the outside of the lower filtering section (74) of the inner primary filter (14). In addition, the extension piece (130) is preferably molded as an integral element of the specialized outlet pipe fitting (18). In addition, this extension piece (130) can be designed to be varying lengths depending on the particular septic system used and local requirements. Further, a support attachment element (92) is used to hold individual specialized outlet pipe fittings (18) apart from each other to reduce strain on the socket (120) and is formed as an integral element into the bottom of this outlet pipe fitting (18). This element (92) can be joined with a second filter system (100) as shown in FIG. 9 to form a series of separate filtering units.

Figure 9:
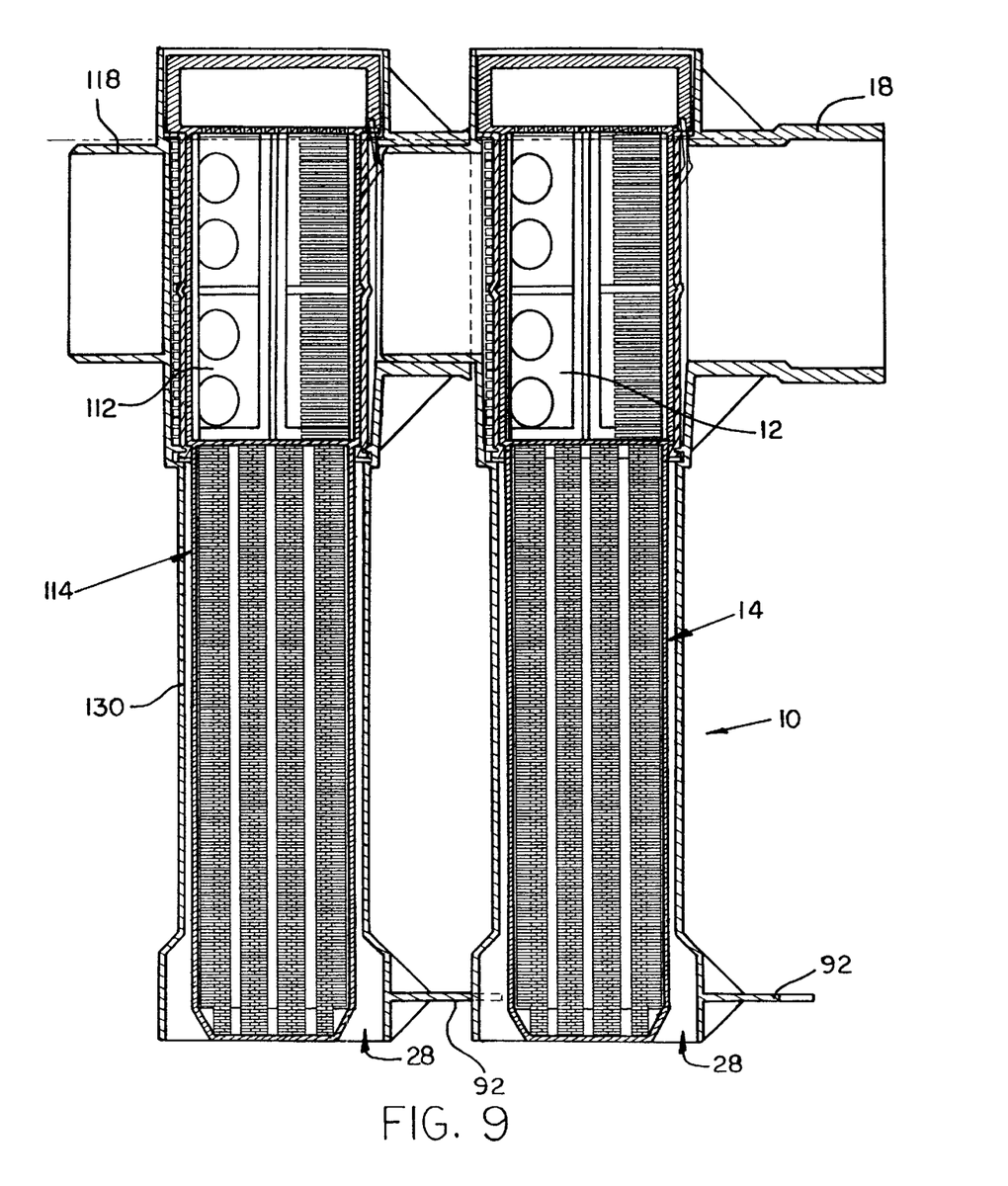
FIG. 9 is a side view of a pair of the alternative removable septic tank filtering systems of FIG. 3, connected in series.

The second filtering system (100) can be secured to the specialized outlet pipe fitting (18) as shown in FIG. 9. This second specialized outlet pipe fitting (118) is designed to receive a second outer secondary (112) filter and a second inner primary filter (114) and hold them in position for filtering effluent present in the septic tank (110).

In operation, unfiltered liquid effluent flows from the generally liquid, effluent layer through the open bottom (28) of the outlet pipe fitting (16) and extension piece (30) where it first encounters the inner primary filter (12) as shown in FIG. 2. As the bottom (76) of the inner primary filter (14) is closed, the effluent must flow around the sides of the lower filtering sections (74) of the inner primary filter (14) where it may pass through filtering openings (88) contained in the lower filtering section (74) of the inner primary filter (14). Alternatively, the effluent may flow upward along the inside surface of the extension piece (30), outside of the inner primary filter (14), where it contacts the filtering connection element (20). The effluent is filtered as it passes through the slots (60) of the filtering connection element (20), where it is filtered prior to discharge through the discharge opening (26). If the effluent passes through the filtering openings (88) of the inner primary filter (14), it then flows upward inside the inner primary filter (14). As the effluent passes through the top section (72) of the inner primary filter (14), it then passes through the filtering slots (46) of the outer secondary filter (12) where it is discharged through the discharge opening (26). If the septic tank system becomes full, the effluent may overflow the top section (72) of the inner primary filter (14) where it is filtered through the filtering openings (80) in the top disc lid (78) of the inner primary filter (14) prior to discharge through the discharge opening (26).

If effluent passes upward within the V-shaped sections (86) of the lower filtering section (74) out through the vertical openings (48) in the top section (72), it then passes into the space between the outer secondary filter (12) and the walls of the outlet pipe fitting (16). That effluent is then also filtered by passing through the filtering projections (50) on the outside of the outer secondary filter (12) prior to passage through the discharge opening (26).

For servicing of the inner primary filter (14), the top handle element (70) of the inner primary filter (14) is pulled upward, which action removes the inner primary filter (14) from the filter system (10) for cleaning. However, because the outer secondary filter (12) remains in place within the filter system (10), effluent passing upward through the outlet pipe fitting (16) is still filtered through the filtering slots (46) in the side (44) of the outer secondary filter (12) even with the inner primary filter (14) removed. This system thus guarantees that effluent present in the septic tank is always filtered, even when the inner primary filter (14) has been removed for cleaning and servicing.

It will be apparent from the foregoing that while particular forms of the invention have been illustrated and described, various modifications can be made without departing from the spirit and scope of the invention.

What is claimed is:

1. A septic tank filtering system comprising
an outer secondary filter, secured within an opening in an outlet pipe, wherein the outer secondary filter comprises a plurality of filtering elements;
a removable inner primary filter slidingly engaged within the outlet pipe;
wherein, upon removal of the inner primary filter from the septic tank, the outer secondary filter filters effluent passing through the outlet pipe opening prior to discharge of the filtered effluent from the septic tank through the plurality of filtering elements contained in the outer secondary filter.

2. The filtering system of claim 1 wherein the inner primary filter further comprises a plurality of filtering openings for filtering effluent and a plurality of secondary openings, larger in size than the filtering openings.

3. The filtering system of claim 2 wherein the plurality of filtering elements in the outer secondary filter align with the larger, secondary openings in the inner primary filter when the inner primary filter is slidingly engaged within the outlet pipe opening.

4. The filtering system of claim 1 wherein the filtering elements of the outer secondary filter are formed in a vertical row.

5. The filtering system of claim 1 wherein the inner primary filter further comprises a plurality of vertical, V-shaped filtering sections.

6. The filtering system of claim 1 wherein the inner primary filter further comprises a closed bottom portion.

7. The filtering system of claim 1 wherein the inner primary filter further comprises a top handle element secured to a top section of the inner primary filter.

8. The filtering system of claim 7 wherein the top section of the inner primary filter further comprises a lid covering a top portion of the inner primary filter and wherein the lid further comprises a plurality of filtering openings.

9. The filtering system of claim 1 further comprising a second septic tank filtering system comprising a second outer secondary filter secured within a second outlet pipe opening and a second inner primary filter secured within the second outlet pipe opening, wherein the second outlet pipe is secured to the first outlet pipe.

10. The filtering system of claim 1 wherein the outer secondary filter is constructed of a plastic material containing a biocide.

11. The filtering system of claim 1 wherein the inner primary filter is constructed of a plastic material containing a biocide.

12. The filtering system of claim 1 wherein the outer secondary filter and the inner primary filter are constructed of a plastic material containing a biocide.

13. A wastewater filtering system comprising
an outer secondary filter secured within an outlet pipe of a wastewater treatment system wherein said outer secondary filter comprises a plurality of filtering slots, and
a removable inner primary filter slidingly engaged within the outlet pipe of the wastewater treatment system, wherein upon removal of the inner primary filter from the wastewater treatment system, the outer secondary filter filters wastewater prior to discharge of that filtered wastewater from the wastewater treatment system through the plurality of filtering slots.

14. The filtering system of claim 13 wherein the inner primary filter further comprises a plurality of filtering openings for filtering effluent and a plurality of secondary openings, larger in size than the filtering openings.

15. The filtering system of claim 13 wherein the plurality of filtering slots in the outer secondary filter align with the larger, secondary openings in the inner primary filter when the inner primary filter is slidingly engaged within the outlet pipe.

16. The filtering system of claim 13 wherein the filtering slots of the outer secondary filter are formed in a vertical row.

17. The filtering system of claim 13 wherein the inner primary filter further comprises a plurality of vertical, V-shaped filtering sections.

18. The filtering system of claim 13 wherein the inner primary filter further comprises a closed bottom portion.

19. The filtering system of claim 13 wherein the inner primary filter further comprises a top handle element secured to a top section of the inner primary filter.

20. The filtering system of claim 13 wherein the top section of the inner primary filter further comprises a lid covering a top portion of the inner primary filter and wherein the lid further comprises a plurality of filtering openings.

* * * * *